(12) United States Patent
Kang et al.

(10) Patent No.: US 9,013,433 B2
(45) Date of Patent: Apr. 21, 2015

(54) FLEXIBLE DISPLAY DEVICE AND DATA DISPLAYING METHOD THEREOF

(71) Applicant: Samsung Electronics Co., Ltd., Suwon-si (KR)

(72) Inventors: Tae Young Kang, Uijeongbu-si (KR); Kyoung Woon Hahm, Seoul (KR); Hyun Jin Kim, Seoul (KR); Ju Yun Sung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/013,841

(22) Filed: Aug. 29, 2013

(65) Prior Publication Data

US 2014/0002402 A1    Jan. 2, 2014

Related U.S. Application Data

(63) Continuation of application No. 12/632,243, filed on Dec. 7, 2009, now Pat. No. 8,654,087.

(30) Foreign Application Priority Data

Dec. 8, 2008    (KR) ........................ 10-2008-0123738

(51) Int. Cl.
   *G06F 3/041*    (2006.01)
   *G06F 3/01*    (2006.01)
   *G06F 1/16*    (2006.01)
   (Continued)

(52) U.S. Cl.
   CPC .......... *G06F 3/017* (2013.01); *G02F 1/133305* (2013.01); *G02F 1/13338* (2013.01); *G06F 1/1626* (2013.01); *G06F 1/1643* (2013.01); *G06F 1/1652* (2013.01); *G06F 1/1684* (2013.01); *G06F 3/041* (2013.01); *G06F 3/0414* (2013.01); *G06F 3/0416* (2013.01); *G06F 3/0483* (2013.01); *G06F 3/04883* (2013.01); *H04M 1/0268* (2013.01);
   (Continued)

(58) Field of Classification Search
   None
   See application file for complete search history.

(56) References Cited

U.S. PATENT DOCUMENTS 6,157,372 A    12/2000    Blackburn et al.
7,298,365 B2    11/2007    Moriyama
(Continued)

FOREIGN PATENT DOCUMENTS

JP    2002-278515    9/2002
JP    2003-015795    1/2003
(Continued)

OTHER PUBLICATIONS

Non-Final Office dated Apr. 26, 2012 issued for related U.S. Appl. No. 12/632,243.
(Continued)

*Primary Examiner* — Nicholas Lee
(74) *Attorney, Agent, or Firm* — H.C. Park & Associates, PLC

(57) ABSTRACT

A flexible display device and a data displaying method thereof are disclosed. The device includes a touch sensor to generate touch events according to touch actions, a flexible sensor to generate a bend signal as one side of the device is bent, a storage unit to store a function table, and a controller to control the components of the device. The function table is configured to define control operations to reproduce currently output contents based on the touch events and the bend events.

31 Claims, 11 Drawing Sheets

(51) Int. Cl.
*G06F 3/0483* (2013.01)
*G06F 3/0488* (2013.01)
*H04M 1/02* (2006.01)
*G09F 9/30* (2006.01)
*G02F 1/1333* (2006.01)

(52) U.S. Cl.
CPC .......... *H04M 2250/22* (2013.01); *G09F 9/301* (2013.01); *G06F 3/0412* (2013.01); *G06F 2203/04102* (2013.01)

(56) References Cited

U.S. PATENT DOCUMENTS

| | | |
|---|---|---|
| 8,018,398 B1 | 9/2011 | Harris |
| 2003/0227441 A1 | 12/2003 | Hioki |
| 2004/0008191 A1 | 1/2004 | Poupyrev et al. |
| 2004/0125081 A1 | 7/2004 | Hayakawa |
| 2005/0257169 A1 | 11/2005 | Tu |
| 2007/0085845 A1 | 4/2007 | Kikuchi et al. |
| 2008/0074399 A1 | 3/2008 | Lee |
| 2008/0303782 A1 | 12/2008 | Grant et al. |
| 2009/0061823 A1 | 3/2009 | Chu |
| 2010/0164888 A1 | 7/2010 | Okumura et al. |

FOREIGN PATENT DOCUMENTS

| | | |
|---|---|---|
| JP | 2004-046792 | 2/2004 |
| KR | 10-2003-0078783 | 10/2003 |

OTHER PUBLICATIONS

Final Office dated Oct. 12, 2012 issued for related U.S. Appl. No. 12/632,243.
Notice of Allowance issued on May 6, 2013 in U.S. Appl. No. 12/632,243.
Non-Final Office Action issued on Apr. 26, 2013 in U.S. Appl. No. 13/737,417.
Non-Final Office Action issued on Oct. 17, 2013 in U.S. Appl. No. 14/013,810.
Notice of Allowanced dated Feb. 14, 2014 in U.S. Appl. No. 14/013,810.
Notice of Allowance issued on Sep. 18, 2013 in U.S. Appl. No. 13/737,417.
Non-Final Office Action dated Apr. 2, 2014 for U.S. Appl. No. 14/165,453.
Non-Final Office Action issued in U.S. Appl. No. 14/013,810 dated Aug. 1, 2014.
Non-Final Office Action issued on Jul. 16, 2014, in U.S. Appl. No. 14/301,042.
Notice of Allowance dated Dec. 19, 2014, in U.S. Appl. No. 14/013,810.
Final Office Action dated Dec. 10, 2014, in U.S. Appl. No. 14/165,453.
Non-final Office Action dated Feb. 4, 2015, in U.S. Appl. No. 14/301,042.
Korean Office Action dated Nov. 28, 2014, in Korean Patent Application No. 10-2008-0123738.

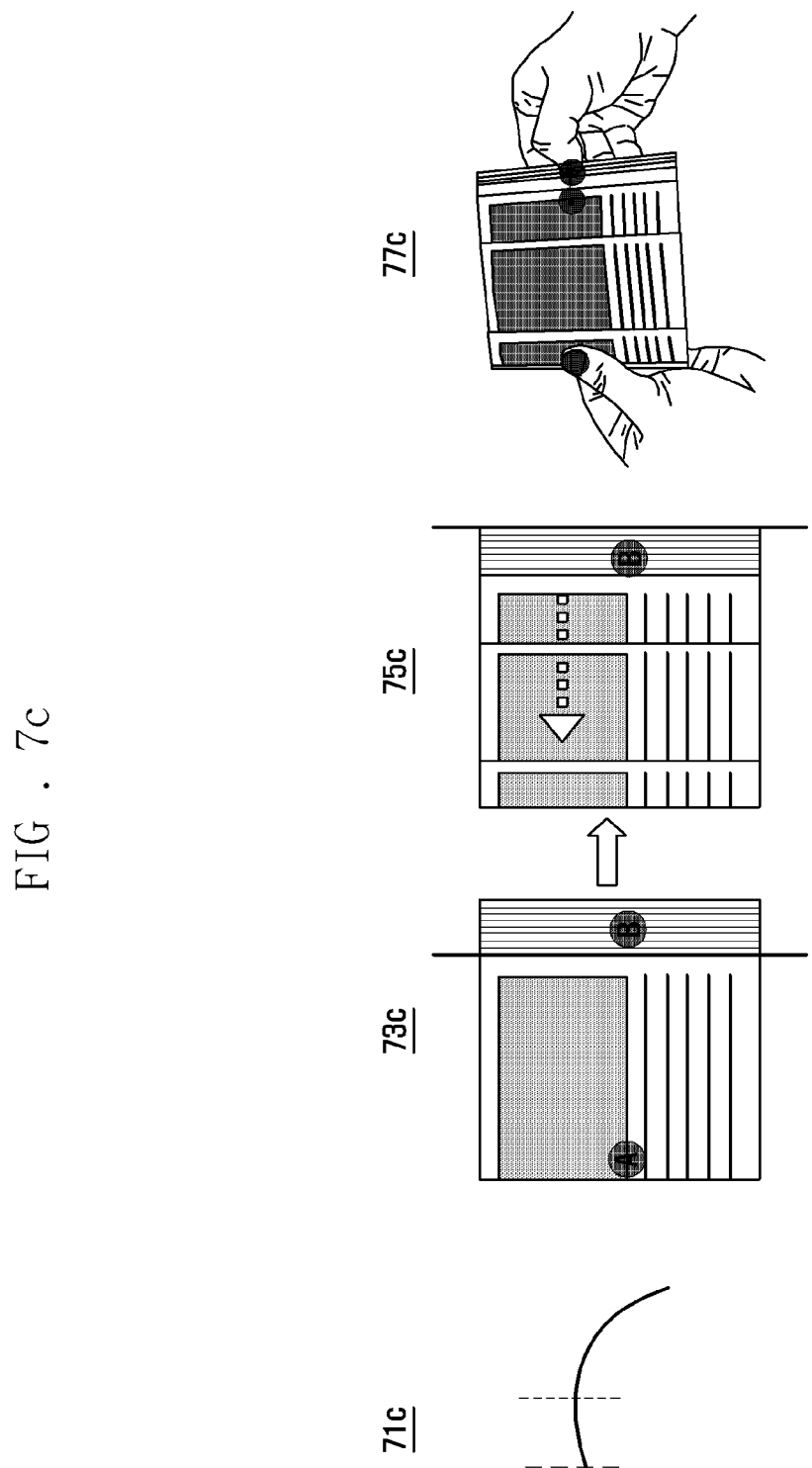

FLEXIBLE DISPLAY DEVICE AND DATA DISPLAYING METHOD THEREOF

CROSS REFERENCE TO RELATED APPLICATIONS

This application is a continuation of U.S. patent application Ser. No. 12/632,243, filed on Dec. 7, 2009 and claims priority from and the benefit of Korean Patent Application No. 10-2008-0123738, filed on Dec. 8, 2008, all of which are hereby incorporated by reference for all purposes as if fully set forth herein.

BACKGROUND OF THE INVENTION

1. Field of the Invention

Exemplary embodiments of the present invention relate to a flexible display technology, and in particular, to providing data display of a flexible display device associated with various input systems utilizing a flexible sensor and a touch sensor system.

2. Description of the Background

Portable terminals are widely used because they can be carried easily. Conventional portable terminals may have a reproducing function, such as an MP3 player function and an image collecting function (e.g., a digital camera). Portable terminals can also support mobile games and/or arcade games.

Portable terminals may execute the functions through displays. Conventional displays of portable terminals may be small and spatial arrangements in the portable terminals may be limited due to the available size. Accordingly, portable terminals have started to employ a display that can be flexible. Such displays may be referred to as flexible displays. Conventional devices with flexible displays may be referred to as flexible display devices. The flexible display devices may receive signals by a simple signal input, and display data stored in the storage unit on the flexible display. A variety of applications may be required to use the flexible display feature.

SUMMARY OF THE INVENTION

Exemplary embodiments of the present invention provide a flexible display device capable of displaying various types of display modes in response to input signals that can be defined based on a flexible display feature, and various data displaying flexible display device.

Additional features of the invention will be set forth in the description which follows, and in part will be apparent from the description, or may be learned by practice of the invention.

Exemplary embodiments of the present invention disclose a device including a touch sensor to detect a touch event. The device also includes a flexible sensor to detect a bend event. The device includes a storage unit to store a function table. The function table includes a command to define function of the device according to the touch event and the bend event. The device further includes a controller to reproduce, by referring to the function table, contents stored in the storage unit, according to the touch event and the bend event. The device includes a display unit to display the reproduced contents.

Exemplary embodiments of the present invention also disclose a method for displaying data for a flexible display device. The method includes detecting a touch event. The method also includes reproducing and displaying contents on a device according to the detected touch event. The method includes detecting a bend event corresponding to bending of the device. The method further includes loading, in response to the bend event, a function table comprising commands that define functions associated with the touch event and the bend event. And the method includes reproducing the contents according to the commands provided by the function table.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

FIG. 7A, FIG. 7B, FIG. 7C, FIG. 8A, FIG. 8B, FIG. 9, FIG. 10A, FIG. 10B, FIG. 10C, and FIG. 10D are diagrams of a flexible display device for supporting various data displaying modes associated with operating a flexible display device that supports a page turning function, according to exemplary embodiments of the invention.

DETAILED DESCRIPTION OF THE ILLUSTRATED EMBODIMENTS

Figure 1:
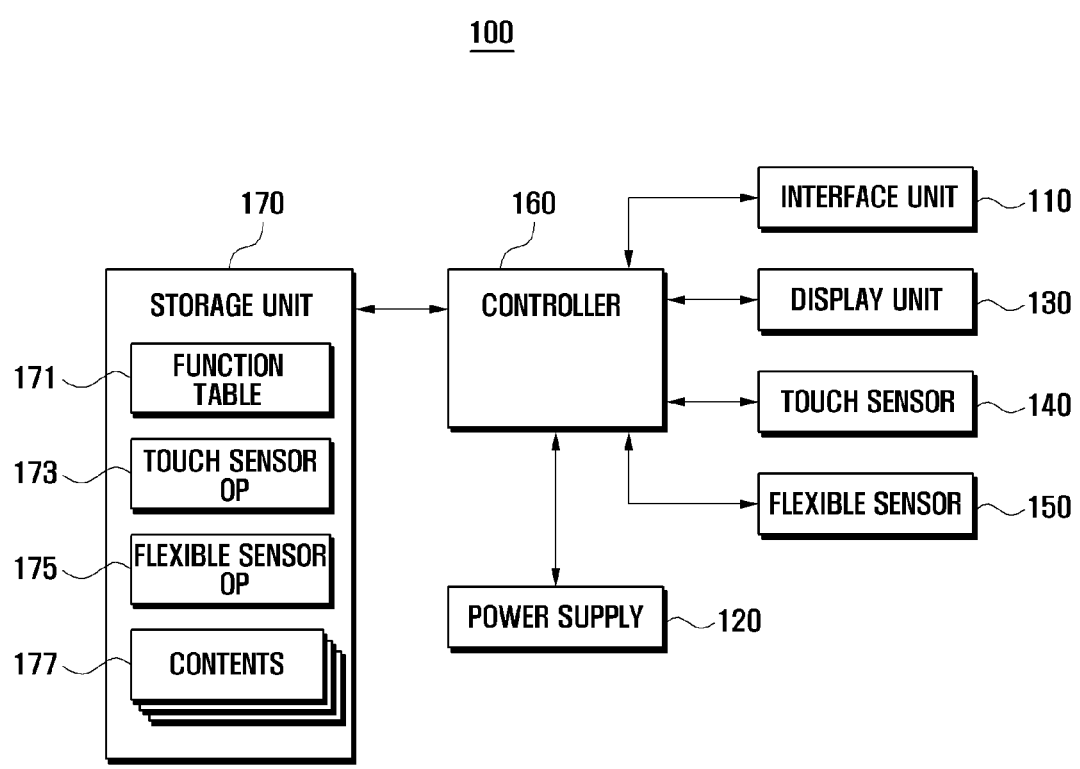
FIG. 1 is a schematic block diagram of a flexible display device according to is exemplary embodiments of the invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments is are provided so that this disclosure is thorough, and will fully convey the scope of the invention to those skilled in the art. In the drawings, the size and relative sizes of layers and regions may be exaggerated for clarity. Like reference numerals in the drawings denote like elements.

Hereinafter, exemplary embodiments of the present invention are described in detail with reference to the accompanying drawings.

FIG. 1 is a schematic block diagram of a flexible display device, according to exemplary embodiments of the present invention.

Referring to FIG. 1, the flexible display device 100 includes an interface unit 110, a power supply 120, a display unit 130, a touch sensor 140, a flexible sensor 150, a storage unit 170, and a controller 160.

By way of example, the flexible display device 100 can be any type of mobile stations, such as handsets, terminals, stations, units, devices, or any type of interface to the user (such as "wearable" circuitry, etc.). The flexible display device 100 can operate the touch sensor 140 and flexible sensor 150 and may detect a bend event where a touch event occurs at one side of the display unit 130 if the flexible display device 100 is bent at more than a determined angle. If the touch event and the bend event occur simultaneously, the flexible display device 100 can generate an input signal and can simultaneously output a content 177 from the storage unit 170 according to the generated input signal. If a touch event additionally occurs in a state where the bend event has occurred, the flexible display device 100 can change and display the content 177 that is currently being displayed on the display unit 130.

In the following description, the configuration of each element in the flexible display device 100 is explained in detail.

The interface unit 110 may allow the flexible display device 100 to communicate with other communication terminals. If the flexible display device 100 serves to support Radio Frequency (RF) communication, the interface unit 110 may be an RF communication unit. If the device 100 serves to support serial communication, the interface unit 110 may be a Universal Serial Bus (USB) interface or a Universal Asynchronous Receiver/Transmitter (UART) interface. The interface unit 110 establishes a communication channel with other communication terminals, mobile communication networks or Internet networks, and receives contents 117 through the communication channel.

The power supply 120 may supply electrical power to each element in the flexible display device 100 under the control of the controller 160. The power supply 120 can be implemented with a battery or a secondary battery.

The display unit 130 may display screens that can be activated according to the function of the flexible display device 100. For example, screens for a booting process, an idle state, and a menu may be activated according to the contents 177. The display unit 130 may be implemented with a display, a flexible liquid crystal display (FLCD), and/or a flexible organic light emitting diode (flexible OLED). The display unit 130 may display data using electronic ink. The display unit 130 can include a panel driving unit, a frame memory for storing data, and a display device. The display unit 130 may be bent in a certain portion by an external physical force.

The touch sensor 140 can be coupled to the front of the display unit 130. The touch sensor 140 can detect touches on the display unit 130 using an input device, for example the user's finger or a stylus pen. The touch sensor 140 can generate touch events based on the detected touches. In particular, the touch sensor 140 may include multiple sensors distributed and arranged, for example, in a matrix format to support multi-touch events. Since the touch sensor 140 can be installed in the front of the display unit 130, the touch sensor 140 may be bent at a certain angle if the display unit 130 is bent. The touch sensor 140 may generate a touch event and may output a touch signal corresponding to the touch event to the controller 160. The touch event may include information associated with touches, such as a touch down, a touch up, a drag, a flick, and/or information regarding a touch location where a corresponding touch has occurred.

The flexible sensor 150 can be implemented in such a way that members, such as optical fibers, that can perform the transmission of signals are coated on the front of the display unit 130. The flexible sensor 150 may detect a flexible operation of the optical fibers caused by the bending of the display unit 130. The flexible sensor 150 may include a plurality of sensors, and may be configured to detect a bend event at a bend location at any region, for example, a front region, of the display unit 130. Therefore, if the display unit 130 is bent at a certain portion (i.e., bend location), the flexible sensor 150 can generate a bend signal corresponding to a bend event and the bending angle. The generated bend signal can be transmitted to the controller 160. The bend event may refer to a bending of the display unit 130, and a bend signal may include information associated with a bend direction, a bend angle, a bend area, and the bend location.

The storage unit 170 can store application programs required to operate the flexible display device 100 and contents 177 received from other external systems, for example, communication terminals, and servers. The storage unit 170 may include a program area and a data area.

The program area can store an operation system (OS) for booting the flexible display device 100 and application programs for supporting multiple functions. Examples of the functions include a call function, a file reproducing function, a menu selecting function, a list searching function, a message writing function, and a web browser for supporting a web surfing function. The program area can also store a program for operating the touch sensor 140 and a program for operating the flexible sensor 150. The touch sensor operation program (Touch Sensor OP) 173 and the flexible sensor operating program (Flexible Sensor OP) 175 may be selectively enabled according to a preset condition when the flexible display device 100 is activated.

The data area can store data generated as the device 100 is being operated and user data related to a variety of optional functions. Examples of the user data include captured images or moving images, phone book data, audio data, and information regarding user data. The data area can store a plurality of contents 177 received, via the interface unit 110, from external systems or other communication terminals. The contents 177 may be images, texts, file information, and/or, for example, pages of a book. The data area stores a function table 171. The function table 171 refers to a table that defines operation states of the flexible display device 100. The operation states can be defined according to the touch event and the bend event. For example, the function table 171 may contain commands to output contents 177 or commands to output contents according to a preset method when the flexible sensor 150 outputs a bend event if one side of a corner of the display unit 130 is bent.

The controller 160 may control an electrical power supply, and enabling or disenabling of each element in the flexible display device 100. The controller 160 also controls the signal flow among elements in the flexible display device 100. The controller 160 can selectively operate the touch sensor 140 and the flexible sensor 150 according to a user's request and may perform functions according to the touch event and bend event, transmitted, respectively, from the touch sensor 140 and the flexible sensor 150, by referring to the function table 171. The controller 160 may include a sensor recognizing unit 161 and a function applying unit 163, as shown in FIG. 2.

Figure 2:
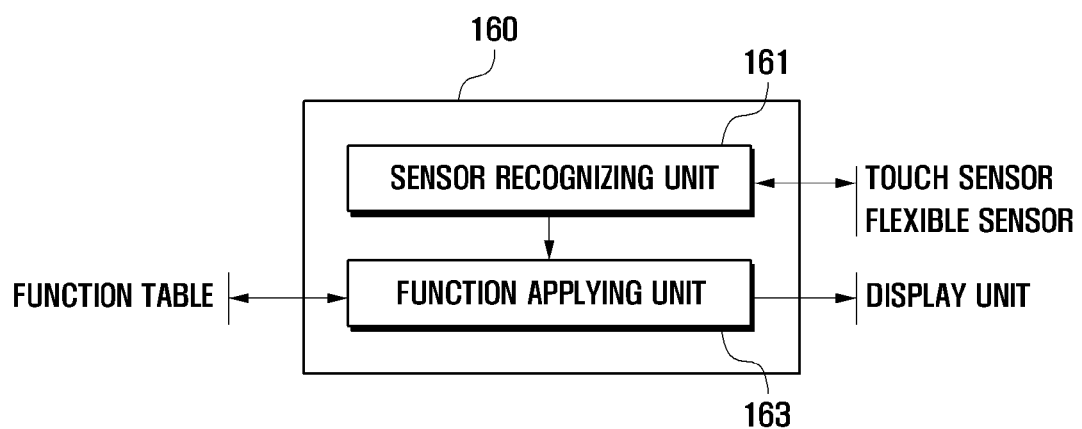
FIG. 2 is detailed view illustrating the controller of FIG. 1, according to exemplary embodiments of the invention.

Referring to FIG. 2, the sensor recognizing unit 161 is configured to detect the touch event and the bend event from the touch sensor 140 and the flexible sensor 150, respectively, and to output the touch signal and the bend signal to the function applying unit 163. The sensor recognizing unit 161 can control a time at which the touch sensor 140 and the flexible sensor 150 are activated. For example, the sensor recognizing unit 161 can load the touch sensor operating program Touch Sensor OP 173 from the storage unit 170 after the flexible display device 100 is booted, and can initialize and activate the touch sensor 140. The sensor recognizing unit 161 can activate the flexible sensor 150 and can load the flexible sensor operating program Flexible Sensor OP 175 from the storage unit 170 if a touch event has occurred at the touch sensor 140. The sensor recognizing unit 161 can simultaneously initialize and activate the touch sensor 140 and the flexible sensor 150. When the display unit 130 is turned on, the sensor recognizing unit 161 can load the touch sensor operating program Touch Sensor OP 173 and the flexible sensor operating program Flexible Sensor OP 175 from the storage unit 170, and can activate the touch sensor 140 and the flexible sensor 150. If the display unit 130 is turned off or is operating in a sleep mode, the sensor recognizing unit 161 can deactivate the touch sensor 140 and the flexible sensor 150 by controlling the electrical power supplied to the touch sensor 140 and the flexible sensor 150.

The function applying unit 163 can receive a touch signal and a bend signal from the sensor recognizing unit 161, respectively, and can load a function table 171 from the storage unit 170. The function applying unit 163 can then control an activated application program by referring to the function table 171. The function applying unit 163 may control the display unit 130 to output the contents 177 from the storage unit 170 according to the touch signal and the bend signal. That is, the function applying unit 163 may provide a proper display environment so that the user can easily and rapidly view the contents 177 that are being displayed on the display unit 130. The function applying unit 163 may change the output contents 177 according to the generated touch signal and the generated bend signal. The function applying unit 163 can also control output of contents 177. In addition, the function applying unit 163 can control the settings for the output contents 177 according to the input touch event and the input bend event.

As described above, the flexible display device 100 may control outputs and modifications of contents displayed on the display unit 130, according to a touch signal and a bend signal generated by the touch sensor 140 and flexible sensor 150, respectively, thereby allowing the user to smoothly search for information.

FIG. 3, FIG. 4, FIG. 5, and FIG. 6 are diagrams of a flexible display device 100 supporting various data displaying modes associated with operating a flexible display device by bending the corner, according to exemplary embodiments of the invention.

Figure 3:
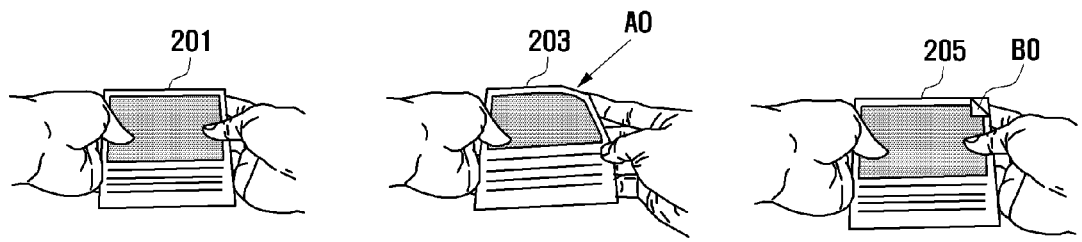
FIG. 3, FIG. 4, FIG. 5, and FIG. 6 are diagrams of a flexible display device for supporting various data displaying modes associated with operating a flexible display device, according to exemplary embodiments of the invention.

Referring to FIG. 3, a user may hold both sides of the display unit 130 of the flexible display device 100 as shown in still shot 201. The thumbs of both hands may touch both sides of the display unit 130. The touch sensors can detect touch events generated by both thumbs and can then output the touch signals to the controller 160. If the controller 160 determines that a touch event has occurred, the controller 160 may control the display unit 130 to display a preset content.

As shown in still shot 203, the user may bend a corner A0 at the upper right of the device 100, at a certain angle, using the right index finger, while the user is holding the device 100 with both hands. The touch sensor 140 of the device 100 may detect the touch events generated at both sides of the device 100, and may send corresponding touch signals to the controller 160. Simultaneously, the flexible sensor 150 may generate a bend event at the corner A0 at the upper right of the device 100. The corner A0 may be bent at various angles, and may be bent, for example, at more than a determined angle. When the corner A0 at the upper right portion of the device 100 is bent, the display unit 130 may output a corresponding portion of a page currently being displayed on the bent corner A0. The controller 160 may also activate the flexible sensor 150 before or when the touch sensor generates a touch signal.

When the controller 160 receives a touch signal and a bend signal from the touch sensor 140 and the flexible sensor 150, respectively, the controller 160 may control the display unit 130 to display a folded image B0 at the upper right corner A0 of the device 100 where the bend event has occurred, as shown in still shot 205. That is, the controller 160 may load the function table 171 from the storage unit 170, and may output a folded image B0 according to the bend event and touch event detected at the corner A0. The controller 160 can change the property of the content on which the folded image B0 is displayed. That is, the controller 160 may recognize the content currently being output as a user's bookmark, and may thus perform a control operation so that property information can be described in the file information of the content. When a touch event occurs on the folded image B0, the controller 160 may display a list of contents having a bookmark property on the display unit 130.

Although the touch events can be generated when a user touches both sides of the device 100, it should be understood that the invention is not limited thereto. For example, the functions of displaying the folded image B0 and of changing the property of content file information according to the display of the folded image B0 can be performed according to a touch event. The functions can be executed by a touch event generated at a first location on the device 100, and a bend event generated at a bend location, as the function table is established or a user's function table is changed. The touch sensor can be initialized in an area where a menu image B1 is output, instead of initializing all the touch sensors in the device 100.

Figure 4:
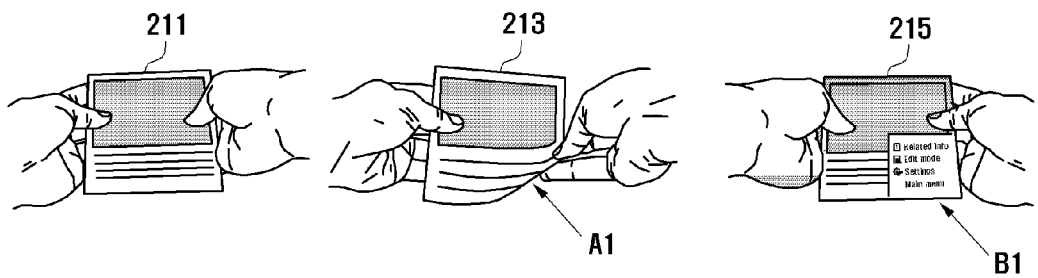

Referring to FIG. 4, initially, a user may hold both sides of the display unit 130 of the flexible display device 100 as shown in still shot 211. The touch sensors 140 may detect touch events by one or both thumbs and may then output corresponding touch signals to the controller 160. If the controller 160 determines that the touch events have occurred, the controller 160 may control the display unit 130 to display a preset content. For example, the controller 160 may control the display unit 130 to display pages corresponding to a book of the contents 177 stored in the storage unit 170. The controller 160 may activate the flexible sensor 150 before or when the touch sensor 140 generates the touch signal.

As shown in still shot 213 of FIG. 4, the user may bend a corner A1 at the lower right of the device 100, at a certain angle, using the right hand, while the user is holding the left side of the device 100 with the left hand. The touch sensor 140 of the device 100 may output, to the controller, the touch signal generated at the left side of the device 100. Simultaneously, the flexible sensor 150 may generate a bend signal at the corner A1. The device 100 may be bent at various angles, and may be bent more than a determined angle. When the corner A1 at the lower right of the device 100 is bent, the display unit 130 may output, for example, a corresponding portion of a page currently being displayed on the bent lower right corner A1.

When the controller 160 receives a touch signal and a bend signal from the touch sensor 140 and the flexible sensor 150, respectively, the controller 160 may load a function table 171 from the storage unit 170, and may control the display unit 130 to display a menu image B1 at the lower right corner A1 of the device 100 according to the bend event that occurred at the lower right corner A1 and the touch event that occurred at the left side of the device. For example, as shown in still shot 215, the menu image B1 may be displayed on the lower right corner A1 where the bend event has occurred. The controller 160 can initialize touch sensors 140 in the lower right corner A1 so that the menu image B1 can be appropriately output. That is, the controller 160 may perform an initialization so that touch events can occur on the items contained in the menu image B1.

Although the menu image B1 is output on the lower right corner A1 of the device 100, it should be understood that exemplary embodiments of the present invention are not limited thereto. For example, the menu image B1 can be displayed on a center portion of the display unit 130, or on another region of the display unit 130 where a touch event continues to occur, so that the user can easily perform a touch action on the display unit 130.

Figure 5:
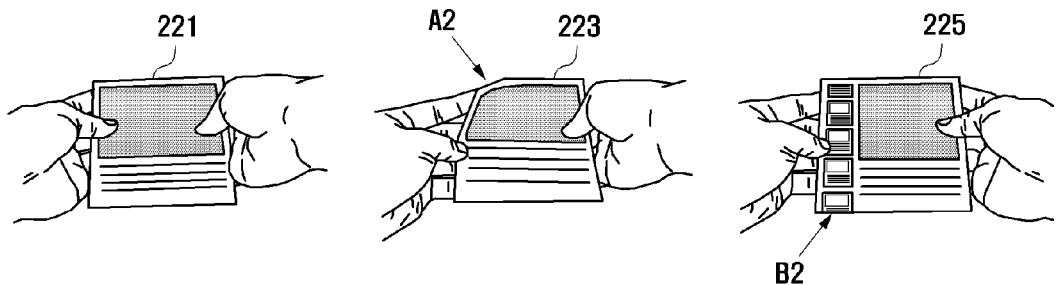

Referring to FIG. 5, a user may hold both sides of the display unit 130 of the flexible display device 100 as shown in still shot 221. The touch sensors 140 may detect touch events by both thumbs and then output corresponding touch signals to the controller 160. If the controller 160 determines that the touch events have occurred, the controller 160 may control the display unit 130 to display a preset content. For example, the controller 160 may control the display unit 130 to display one of the pages contained in a document file that is one of the contents 177 stored in the storage unit 170. The controller 160 may activate the flexible sensor 150 before or when the touch sensor 140 generates a touch signal.

As shown in still shot 223, the user may bend a corner A2 at the upper left of the device 100 at a certain angle, using the left index finger, while the user is holding the device 100 with both hands. The touch sensor 140 of the device 100 may continue to output, to the controller 160, the touch signals generated as both hands hold both sides of the display unit 130. The activated flexible sensor 150 may detect a bend event as the lower left cornet A2 is bent over a certain angle, and may output the generated bend signal to the controller 160. As the upper left corner A2 of the device 100 is bent, the display unit 130 may displays the page currently being output on the bent lower left corner A2. The controller 160 may activate the flexible sensor 150 before or when the touch sensor 140 generates a touch signal.

When the controller 160 receives a touch signal and a bend signal from the touch sensor 140 and a flexible sensor 150, respectively, the controller 160 may load a function table 171 from the storage unit 170. The controller 160 may display a slide view image B2 based on the bend event detected at the upper left corner A2 and the touch event detected at both sides of the display unit 130. Therefore, as shown in still shot 225, the controller 160 may display the slide view image B2 on the left side where the bend event has occurred. The controller 160 can initialize touch sensors 140 on the left side of the display unit 130, thereby allowing the user to select other pages displayed on the left side. The controller 160 may initialize the touch sensors 140 so that touch events can be detected with respect to items contained in the slide view image B2.

Although the slide view image B2 is displayed on the left side, exemplary embodiments of the present invention are not limited thereto. For example, the slide view image B2 can be displayed on the center portion of the display unit 130. In some cases, the slide view image B2 can also be displayed on the right side or upper or lower margin area of the display unit 130, so that the user can easily perform a touch action on the display unit 130. The controller 160 can partially initialize touch sensors 140 with respect to an area where the slide view image B2 is displayed, instead of initializing all the touch sensors 140. The area where the slide view image B2 is displayed can be implemented to support various functions according to types of touch events detected by the touch sensor 140, for example, a flick, drag, and double touches.

Figure 6:
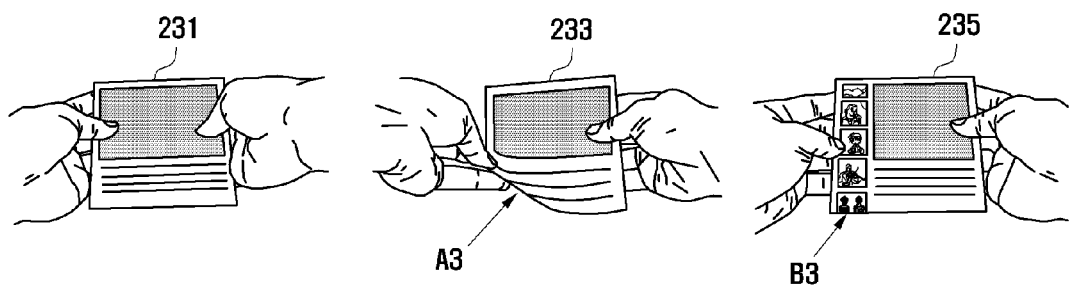

Referring to FIG. 6, a user may hold both sides of the display unit 130 of the flexible display device 100 as shown in still shot 231. The touch sensors 140 may detect touch events by both thumbs and then output touch signals to the controller 160. If the controller 160 determines that the touch events have occurred, the controller 160 may control the display unit 130 to display a preset content. For example, the controller 160 may control the display unit 130 to display one of the contents 177 stored in the storage unit 170. The controller 160 may activate the flexible sensor 150 before or when the touch sensor 140 generates a touch signal.

As shown in still shot 233, the user may bend a corner A3 at the lower left of the device 100, at a certain angle, using the left hand, while the user is holding the right side of the device 100 with the right hand. The touch sensor 140 of the device 100 may continue to output, to the controller 160, the touch signals generated at the right side of the device 100. The flexible sensor 150 may generate a bend signal as the lower left corner A3 is bent over a certain angle. When the corner A3 at the lower left of the device 100 is bent, the display unit 130 may output a corresponding portion of a page currently being displayed on the bent lower left corner A3.

When the controller 160 receives a touch signal and a bend signal from the touch sensor 140 and a flexible sensor 150, respectively, the controller 160 may load a function table 171 from the storage unit 170. The controller 160 may then display a multi view image B3 based on the bend event detected at the lower left corner A3 and the touch event detected at the right side of the display unit 130. Therefore, as shown in still shot 235, the controller 160 may display the multi view image B3 on the left side (of the display unit 130) where the bend event has been detected. The controller 160 can initialize touch sensors 140 on the left side of the display unit 130, thereby allowing the user to select other contents displayed on the left side of the display unit 130. The controller 160 may initialize touch sensors 140 so that touch events can be detected with respect to respective contents contained in the multi view image B3.

Although the multi view image B3 is displayed on the left side, it should be understood that exemplary embodiments of the present invention are not limited thereto. For example, the multi view image B3 can be displayed in the center portion of the display unit 130. In some cases, the multi view image B3 can also be displayed in the right side or upper or lower margin area of the display unit 130, so that the user can easily perform a touch action on the display unit 130. The controller 160 can partially initialize touch sensors 140 with respect to an area where the multi view image B3 is displayed, instead of initializing all the touch sensors 140. The area where the multi view image B3 is displayed can be implemented to support a variety of functions according to the touch events detected by the touch sensor 140, such as, for example, a flick, a drag, and double touches. If other content, for example, an audio file, is selected in the multi view image B3, the controller 160 may terminate the output of a current content and may starts to output the selected audio file back.

FIG. 7A, FIG. 7B, FIG. 7C, FIG. 8A, FIG. 8B, FIG. 9, FIG. 10A, FIG. 10B, FIG. 10C, and FIG. 10D are diagrams of a flexible display device 100 for supporting various data displays associated with operating a flexible display device that supports a page turning function, according to exemplary embodiments of the present invention.

Figure 7A:
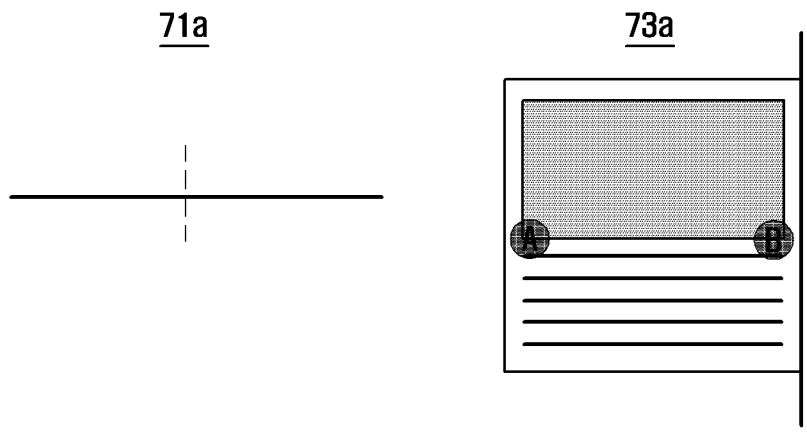

Referring to FIG. 7A, in state 71a, the display unit 130 of the flexible display device 100 is not bent with respect to a central axis of the display unit 130. In state 73a, the display unit 130 is not bent and a touch event may be detected at both sides A and B. A content stored in the storage unit 170 may be output on the display unit 130 according to the detected touch event and a user's request. The content can be output according to a touch event that is detected at one or both sides of the display unit 130. If a touch event is detected, the flexible is display device 100 may activate a flexible sensor 150. In some cases, the flexible display device 100 can also activate the flexible sensor 150 when activating the touch sensor 140.

Figure 7B:
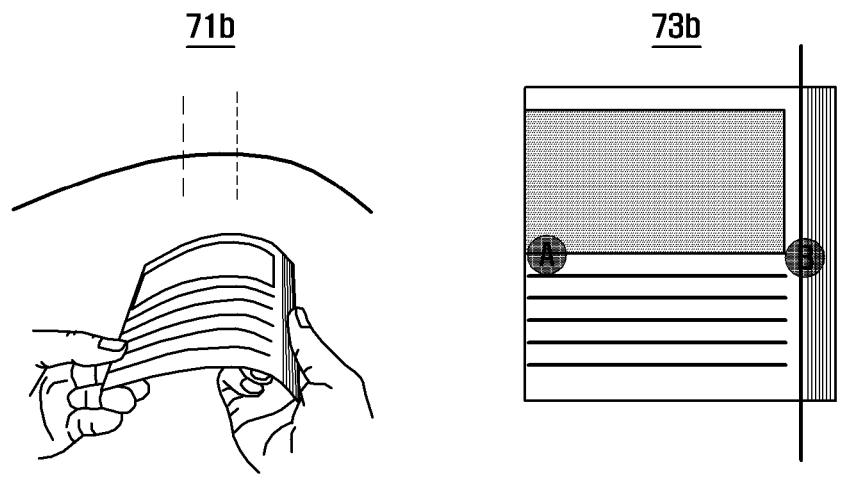

Referring to FIG. 7B, in state 71b, the right side of the display unit 130 is bent more than the left side of the display unit 130 with respect to the center axis of the display unit 130. In state 73b, the display unit 130 is bent asymmetrically, and the flexible display device 100 may perform a control operation where contents may be displayed on the side that is more bent than the side that is less bent. For example, the flexible display device 100 may receive a bend signal from flexible sensors 150 as the display unit 130 is bent. The flexible display device 100 may compare information regarding a bend angle associated with the bend event at the right side of the display unit 130, for example, with information regarding a bend angle associated with the bend event at the left side of the display unit 130. The flexible display device 100 may determine that the bend angle of the right side is greater than that of the left side. The flexible display device 100 can then display contents on the right side with a certain interval between the contents.

Referring to FIG. 7C, as shown in state 71c, the flexible display device 100 can determine a width of the display unit 130 on which contents can be displayed, according to a touch event B and a bend angle transmitted from the right side. For example, as shown in FIG. 7B, the smaller the bend angle of the right side in a state 71b, the smaller the display width displayed in the flexible display device 100 in a state 73b. As shown in FIG. 7C, the larger the bend angle of the right side in a state 71c, the larger the display width in the flexible display device 100 in a state 73c.

As shown in states 75c and 77c, output of the contents can be controlled according to touch events. For example, a touch event B generated at the right side can be moved to a right margin along the right side of the display unit 130 according to a user's control, so that the touch event B is moved to the right margin having a certain width within which other contents may be displayed. In response to detecting the touch event B, the display of the other contents in the right margin may be changed. For example, the other contents within the right margin may be browsed or viewed individually, or pages of a book may be turned from right to left.

FIG. 7A, FIG. 7B, and FIG. 7C can be explained using the example of a book. A book may be composed of a plurality of pages corresponding to multiple leaves. Each leave can display a page. A user can hold both the left side and the right side of the book using the user's hands. If the user intends to turn over a leaf, the user can hold the right side of the book (i.e., allowing for the selection of the pages or leaves, using the right hand). The user can hold a side of the book in such a way that the thumb of the right hand may be located on the right side of the book and the remaining four fingers are located on the rear right side of the book. Accordingly, if the user applies a downward force on the book, the right side of the book may be bent so that the text in the book may be tilted at a certain angle. A thumb pressing a particular leaf or page may correspond to a touch event being detected along a margin of the display unit 130. The larger the bend, the larger a block width of the book, as shown in states 73b of FIGS. 7B and 73c in FIG. 7C. A block width may correspond to a region on the display unit 130 on which the page margins, or portions of a page, of a book overlap, as shown in FIG. 7A, FIG. 7B, and FIG. 7C.

As shown in FIG. 7C, if the thumb pressing the leaves is moved towards the right margin, the leaves may be turned from right to left.

As described above, the flexible display device 100 can browse through a plurality of pages corresponding to the paper leaves of a book. A flexible display device 100 may continue to detect touch events and to display a portion of other pages within a certain width according to the bend angle. If the user's touch is moved to the right margin, pages released by the touch event may be turned from right to left, and a corresponding page may be output. A page on which a touch event has been detected can continue to be displayed on the display unit 130. If the touch event moves and releases the page being displayed, the released page may be replaced with another page that retains the touch event.

Although pages are turned over as a touch event moves in the block width of the pages, it should be understood that exemplary embodiments of the present invention are not limited thereto. For example, pages can be turned according to a change in the bend event while the touch event is fixed. The width of the block width may be determined according to the bend angle of the bend event. If, for example, the width of the block width is increased as the bend angle is increased, the width of the block width may become larger and pages may be turned until the page on which the touch event B is detected is displayed. Therefore, the flexible display device 100 may turn pages according to the detection and release of the touch event B, thereby replacing a page with another page retaining the touch event B.

Figure 8A:
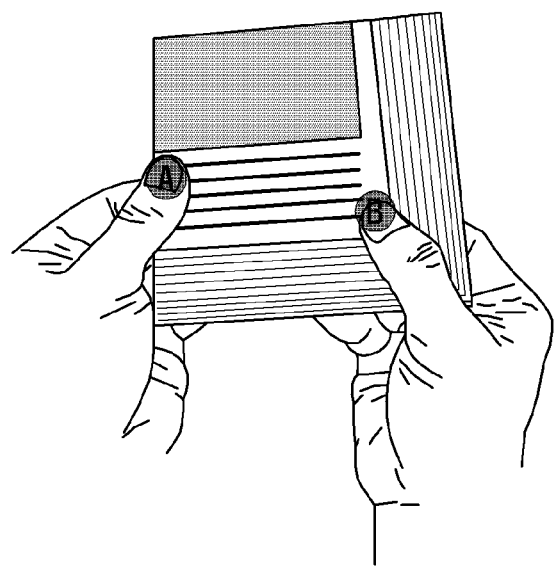
Figure 8B:
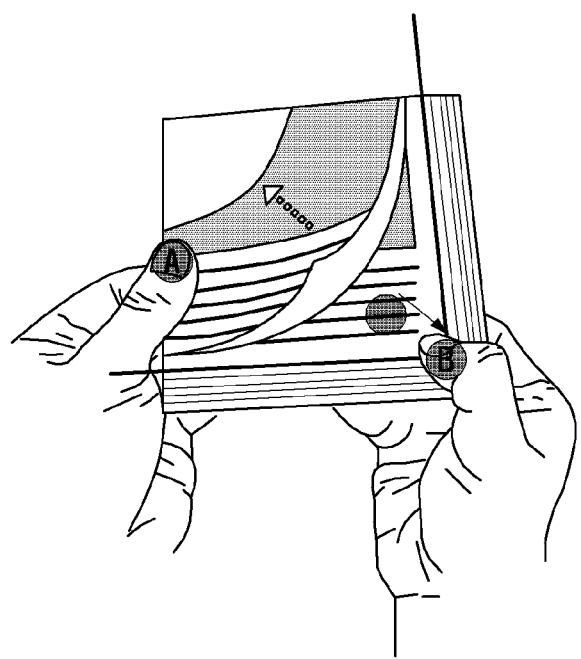

Referring to FIG. 8A and FIG. 8B, the flexible display device 100 may activate touch sensors 140 and may display contents 177 (e.g. a page of a book) stored in the storage unit 170 on the display unit 130 according to the user's request. When the page is displayed on the display unit 130, the flexible display device 100 may activate a flexible sensor 150 according to a preset condition.

The flexible display device 100 can detect touch events on the left side A and the lower right side B of the display unit 130, and, in general, on any side of the display unit 130. The device 100 can display contents on the lower right side B of the display unit 130. A touch event and a bend event may be detected on the contents and/or on the lower right side B. That is, the device 100 can overlap pages at their corners and margins to form the block width, as noted above. As shown in FIG. 8A, the device 100 may display the lower fore edge and bottom edge of the pages on the display unit 130, while the pages obliquely overlap.

When the touch event detected at the bottom edge B moves towards a corner of the display unit 130, the flexible display device 100 turns the pages (e.g., flips to the next page). It can be appreciated that other suitable methods of turning pages may be used and that turning pages is not limited to moving the touch event towards the right side or the lower side of the display unit 130.

Figure 9:
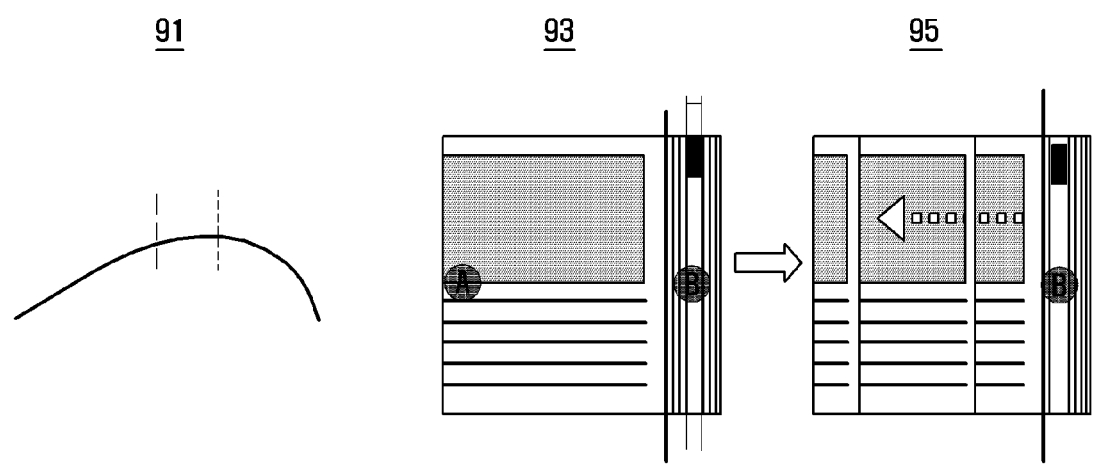

Referring to FIG. 9, as described hereinabove, the flexible display device 100 may activate touch sensors and may display contents stored in the storage unit 170 on the display unit 130 according to a user's request. When a page retrieved from the storage unit 170 is displayed on the display unit 130, the flexible display device 100 may activate a flexible sensor 150 according to a preset condition.

The controller 160 of the flexible display device 100 may detect, via the flexible sensor 150, a bend event if the right side of the display unit 130 is bent at a certain angle. The bend event may be caused by a physical force that the user applies to the right side. When a bend event occurs as shown in a state 91, the controller 160 can determine that the bend event has occurred asymmetrically at the right side with respect to the central axis. Accordingly, the controller 160 may control the display unit 130 to display a portion of other pages on the right side as shown in a state 93. If a page has a bookmark, the controller 160 can display the bookmark on a certain area. More specifically, if an asymmetrical bend event has been detected, the controller 160 may identify file information regarding contents 177 stored in the storage unit 170, and may check whether the user has already set a book mark in the contents. If the controller 160 determines that a page is set as a bookmark, the display unit 130 may show a portion of the pages according to the detection of the asymmetrical bend event, and may simultaneously display the page having the bookmark so that the page with the bookmark can be distinguished from other pages. For example, as shown in a state 93, the controller 160 may control the display unit 130 to display a page having a bookmark in such a way that the output area of the page is greater than an output area of other pages or a portion of the output area of the page has a bookmark symbol M.

If a page has a bookmark, the controller 160, as shown in a state 95, can control a page turning function for the page with the bookmark differing from that of other pages. For example, if a touch event is moved and subsequently released from pages within a certain width of the block width where a portion of pages are displayed, the display unit 130 may display an image on pages released by the touch event from right to left, as shown in FIG. 9, and may simultaneously display another pages retaining the touch event on the display unit 130. The display unit 130 may display images on pages for a certain time interval corresponding to the time the touch event is released from each page. The controller 160 may control the display unit 130 to display a page having a bookmark for a longer time interval than pages not having a bookmark. Therefore, the flexible display device 100 can turn the pages from right to left in a certain time interval, and in particular, can output, on the display unit 130, a page having a bookmark for longer than other pages not having a bookmark.

In some cases, if a touch event is moved on a page, the page may not be turned and may continue to be displayed on the display unit 130. For example, while the page turning function is performed, pages can be turned over at a certain time interval. Although a touch event may be released from a page, if a touch event re-designates (e.g., reselects by detection of a touch event) the page that is being displayed or being turned over on the display unit 130, the controller 160 can stop turning the page and may continue displaying the page. If a touch event, such as a drag touch or a flick, is detected, the display unit 130 may re-display the designated page on the entire display unit 130 or may remove a corresponding page from the display unit 130.

Although the page turning function is implemented in such a way that a touch event is released from a corresponding page and an image corresponding to the page is moved at a certain time interval, exemplary embodiments of the invention are not limited thereto. For example, the controller 160 may turn a page immediately after a touch event is released from the page.

Figure 10A:
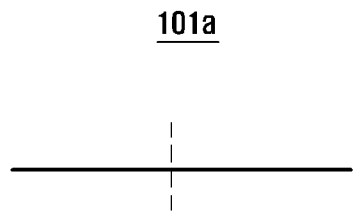
Figure 10A:
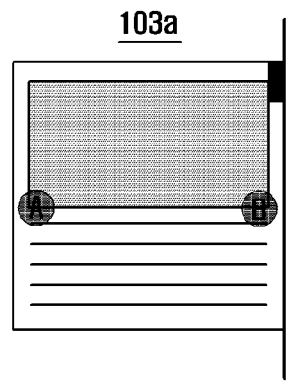

Referring to FIG. 10A, in state 101a, the display unit 130 of the flexible display device 100 is not bent with respect to the central axis of the flexible display device 100. In state 103a, the display unit 130 is bent and touch events may occur at one or both sides A and B. A content 177 stored in the storage unit 170 may be output on the display unit 130, according to a user's request. The content 177 can be output according to touch events that can be detected at one or both sides of the display unit 130. If a touch event is detected, the flexible display device 100 may activate a flexible sensor 150. In some cases, the flexible display device 100 can also activate the flexible sensor 150 when activating the touch sensor 140.

Figure 10B:
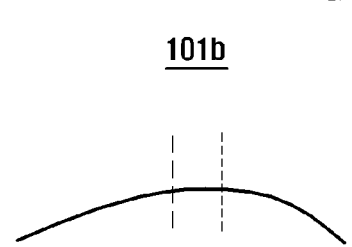
Figure 10B:
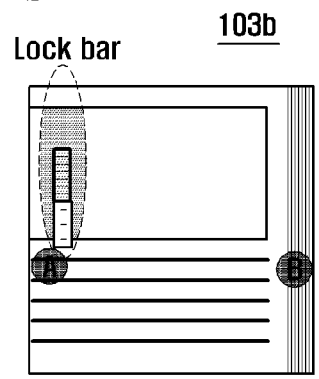

Referring to FIG. 10B, in state 101b, the right side of the display unit 130 is more bent than the left side of the display unit 130 with respect to the center axis. When the display unit 130 is bent asymmetrically, the flexible display device 100 may perform a control operation where at least some contents can be displayed on the side that is more bent, as shown in a state 103b. For example, the flexible display device 100 may receive a bend signal from flexible sensors 150 as the display unit 130 is bent and may compare information regarding a bend angle of the right side with, for example, the bend angle of the left side. The flexible display device 100 may determine whether the bend angle of the right side is greater than the bend angle of the left side. If the flexible display device 100 determines that the bend angle of the right side is greater, the flexible display device 100 can display other contents on the right side of the display unit 130 with a certain interval between the contents. If a touch event A is retained over a certain time period, the controller 160 may generate a lock bar for setting a current screen state. The lock bar may be displayed on the left side (e.g., the side with the smaller bend angle) of the display unit 130, as shown in a state 103b. The lock bar may partially overlap a location where the touch event A is detected, so that the user can easily operate an activation or deactivation of the lock bar. The lock bar can be removed from the display unit 130 if the touch event A is released.

Figure 10C:
Figure 10C:
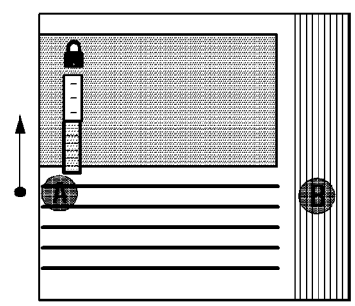

Referring to FIG. 10C, if the user moves the touch event A and thus a lock bar function is activated, the controller 160 may display an image corresponding to the activation of the lock bar function on one side, for example, above the lock bar or on one side of the content being displayed.

Figure 10D:
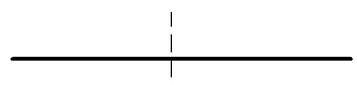
Figure 10D:
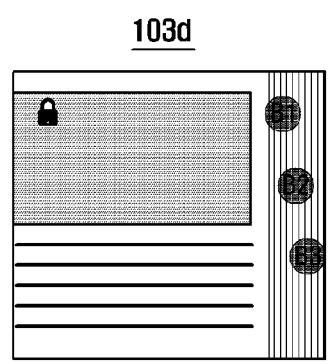

Referring to FIG. 10D, although a bend event does not occur in the flexible display device 100 as shown in a state 101d, the controller 160 may display a portion of other pages on the right side according to the lock bar function. As shown in state 103d, the controller 160 may also display symbols B1, B2, and B3 indicating pages having a bookmark in a certain area of the block width, thereby distinguishing between pages having a bookmark and other pages. Subsequently, if the user touches one of the symbols B1, B2, and B3, the controller 160 may display the page corresponding to the touched symbol.

Figure 11:
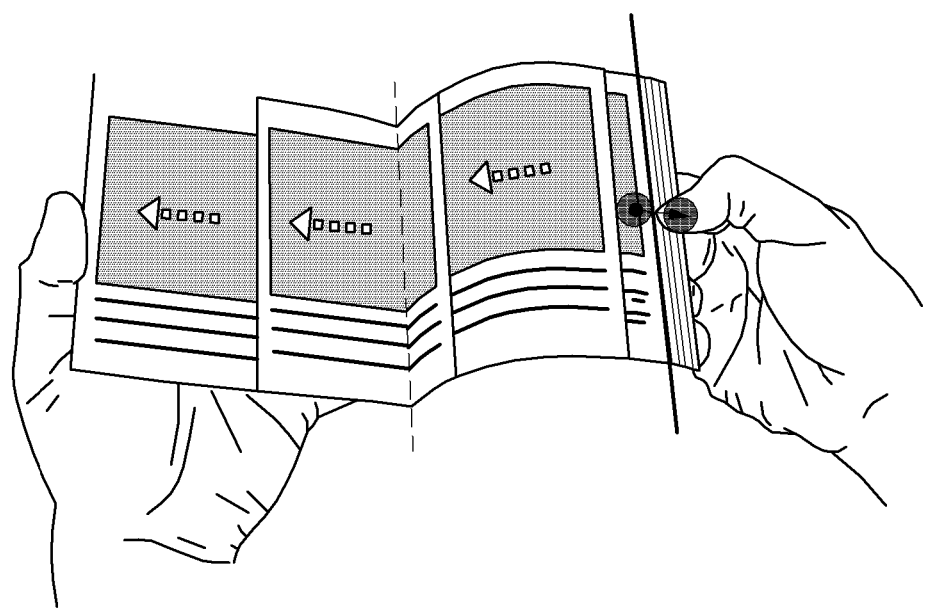
FIG. 11 is a view illustrating a flexible display device according to exemplary embodiments of the invention.

FIG. 11 is a view illustrating a flexible display device 100 according to exemplary embodiments of the present invention.

Referring to FIG. 11, in some cases, the display unit 130 of the flexible display device 100 can be folded with respect to the center axis. That is, the display unit 130 may include a first display unit and a second display unit that can be connected to each other with respect to the center axis. The first display unit can be supported by the left had and the right display unit can be supported by the right hand. If the second display unit is bent at a certain angle, the controller 160 may receive a bend signal from flexible sensors 150 and may perform a page turning function as described above, based on the bend event. The controller 160 may perform a page turning function by moving the page from the second display unit to the first display unit.

Figure 12A:
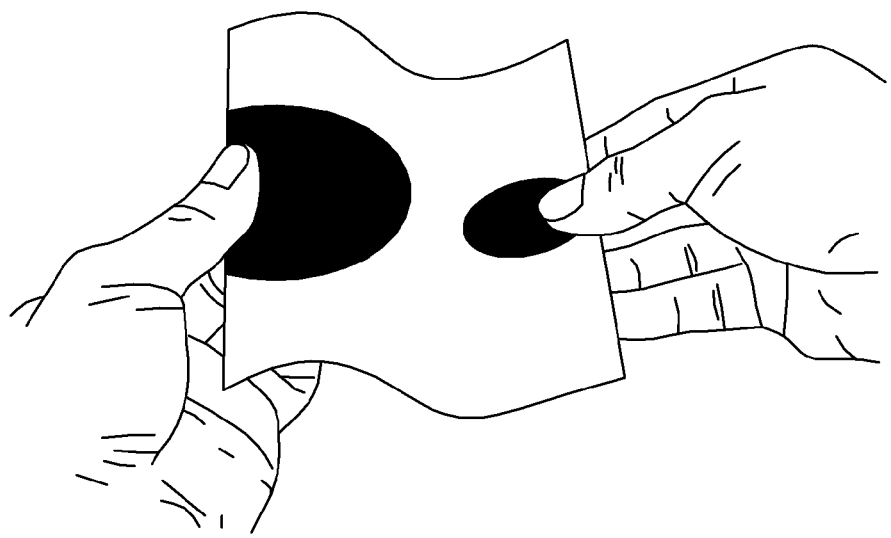
FIG. 12A and FIG. 12B are diagrams of a flexible display device capable of supporting enlargement and reduction functions, according to exemplary embodiments of the invention.
Figure 12B:
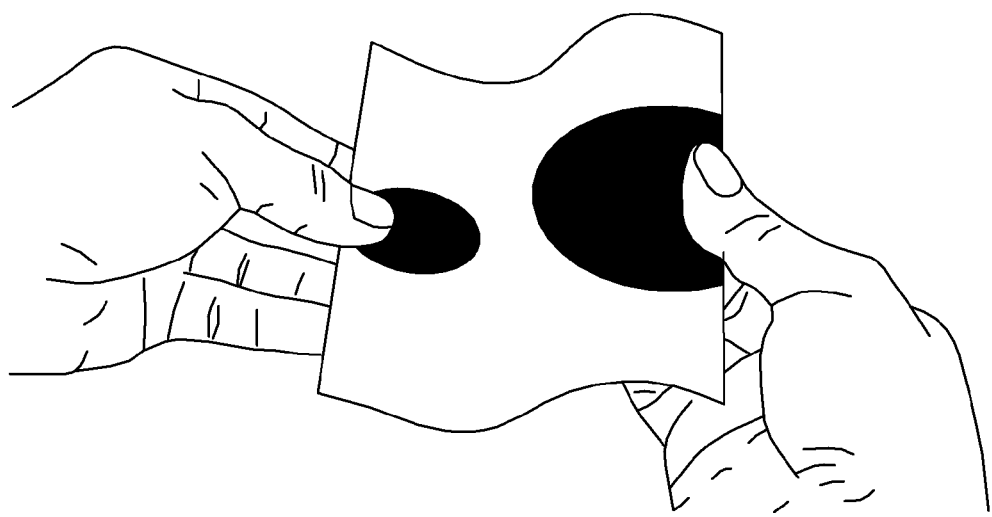

FIG. 12A and FIG. 12B are diagrams of a flexible display device 100 capable of supporting enlargement and reduction functions, according to exemplary embodiments of the invention.

Referring to FIG. 12A and FIG. 12B, in some cases, the flexible display device 100 may be bent in a sinusoidal waveform. The flexible sensors 150 may generate first and second bend signals based on bend events corresponding to different directions. The bend signals may be output to the controller 160. For example, the first bend signal may contain information that represents a bend where, for example, the left (or right) side of the display unit 130 with respect to the center axis of device 100 is bent upward. The second bend signal may contain information that represents a bend where the left (or right) side of the display unit 130 with respect to the center axis of device 100 is bent downward. When the controller 160 receives a plurality of bend signals having direction values differ from each other, the controller may enlarge or reduce a size of contents located in areas where bend events have occurred, respectively, and may then display the re-sized contents.

Referring to FIG. 12A, if the left side of the display unit 130 with respect to the center axis is bent upwards and the right side is bent downwards, the flexible sensors 150 may generate first and second bend signals indicating bend directions that differ from each other, and may output the bend signals to the controller 160. Additionally, the touch sensors 140 may also output, to the controller 160, information regarding locations on the display unit 130 that the user's fingers touched. The controller 160 may enlarge and display a content located on the left side of the display unit 130, according to the received touch signals and bend signals. For example, the controller 160 may zoom in on the content located at the left side of the display unit 130, and may enlarge and display the content. The controller may also simultaneously reduce and display a content located on the right side of the display unit 130. For example, the controller 160 may zoom out of the content located at the right side of the display unit 130, and may reduce and display the content.

Referring to FIG. 12B, if the left side of the display unit 130 with respect to the center axis is bent downwards and the right side of the display unit 130 is bent upwards, the flexible sensors 150 can generate first and second bend signals indicating bend directions that differ from each other, and may output the bend signals to the controller 160. Additionally, the touch sensors 140 may also output information, to the controller 160, regarding locations on the display unit 130 that the user's fingers touched. The controller 160 may then reduce and display a content located on the left side of the display unit 130, according to the received touch signals and bend signals. For example, the controller 160 may zoom out of the content located at the left side of the display unit 130, and may reduce and display the content. Simultaneously, the controller 160 may enlarge and display a content located at the right side of the display unit 130. For example, the controller 160 may zoom in on the content located at the right side of the display unit 130, and may enlarge and display the content.

As described above, two bend events whose bend directions differ from one another may be detected at the right and left sides of the display unit 130 with respect to the center axis. However, exemplary embodiments of the invention are not limited thereto. For example, the display unit 130 may be divided equally in three portions, so that both side portions are symmetrically bent in the same direction with respect to the center portion, and the center portion may be bent in an opposite direction to the bend direction of both side portions. The flexible sensors 150 may generate and output three bend signals to the controller 160. When the controller 160 receives the three bend signals, the controller 160 may reduce and display a content located at the portion(s) of the display unit 130 that is bent downwards. Simultaneously, the controller 160 may enlarge and display a content located in the portion(s) of the display unit 130 that is bent upwards.

In the foregoing description, exemplary embodiments have been described regarding the operations of the flexible display device 100 based on the touch events and bend events detected by the touch sensors and bend sensors, respectively. A method for displaying data in the flexible display device 100 is explained in detail with reference to FIG. 13.

Figure 13:
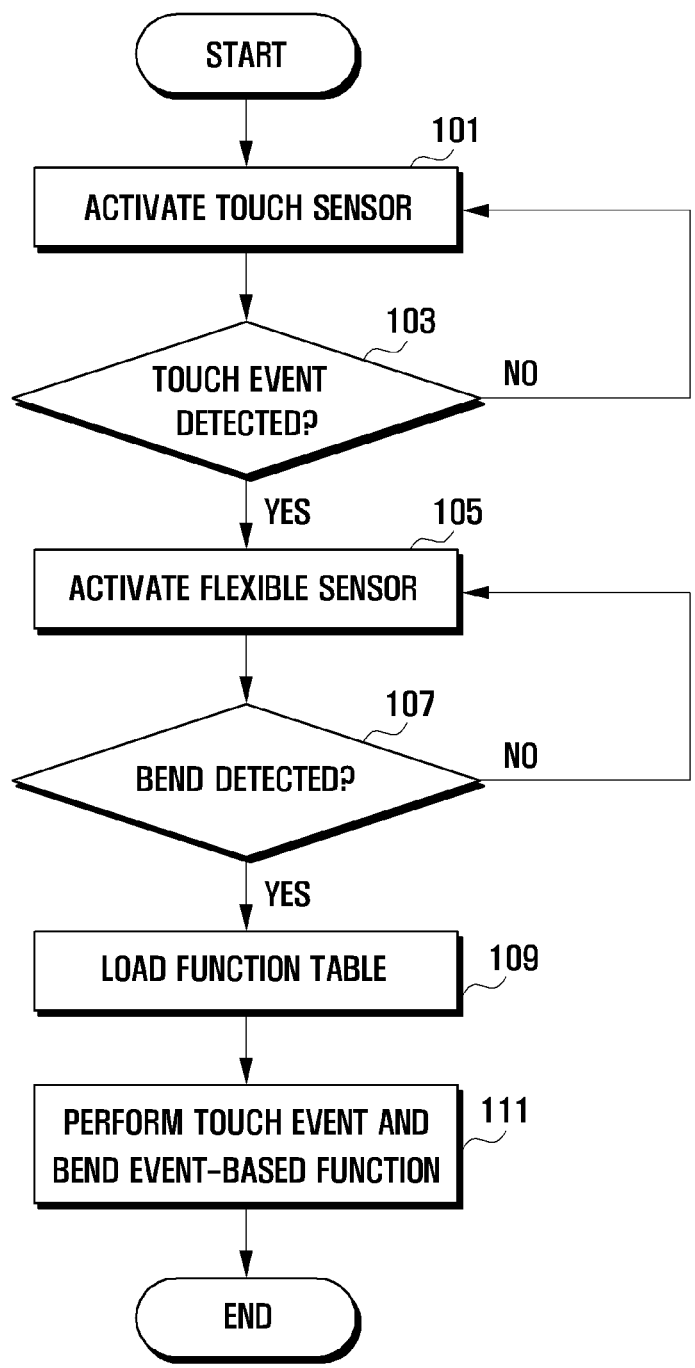
FIG. 13 is a flow chart that describing a method for displaying data in a flexible display device, according to exemplary embodiments of the present invention.

FIG. 13 is a flow chart describing a method for displaying data in a flexible display device 100 according to exemplary embodiments of the present invention.

Referring to FIG. 13, when the flexible display device 100 is turned on, the controller 160 may perform multiple processes including a booting process, may output a standby screen on the display unit 130, and may activate the touch sensors 140 to detect touch events (101).

Subsequently, the controller 160 may detect whether a touch event is detected (103). If the controller 160 determines that a touch event is not detected, the controller 160 may retain the activation state of the touch sensor 140.

If the controller 160 determines that a touch event is detected at step 103, the controller 160 may receive a touch signal from the touch sensors 140, execute a function according to the touch signal, and may activate the flexible sensors (105). In some cases, the controller 160 may activate the flexible sensors 150 when the controller 160 activates the touch sensor at step 101.

The controller 160 may then determine whether a bend is detected (107). If the controller 160 determines that a bend is not detected at step 107, the controller 160 may retain the activation state of the flexible sensors 150 and may execute a function according to the touch signal. If the controller 160 determines that a bend is detected at step 107, the controller 160 may receive a bend signal from the flexible sensors 150, and load a function table from the storage unit 170 (109). The function table may be a table that describes functions to be executed according to detected touch events and bend events.

The controller 160 may execute a function based on the detected touch events and bend events by referring to the function table (111). For example, if the controller 160 receives a bend signal corresponding to a corner bending operation, the controller 160 may execute a function related to bending of a corner of the display unit 130, such as, for example, a folding function, a menu function, a slide view function, and a multi view function. The folding function can be performed in such a way that the controller 160 may apply a folded image to a content being displayed on the display unit 130, and display the folded image on the display unit 130. The folding function may refer to a function in which a content property, for example, a bookmark property, is added to the content being displayed on the display unit 130. In the menu function, the controller 160 may initialize touch sensors 140 in an area where a menu image is displayed, and may activate items therein for being selected. The menu function may allow menu images to be displayed and items in the menu images to be executed. In the slide view function, the controller 160 may initialize the touch sensors 140 in an area of the display unit 130 so that other slides of a currently output content can be output in a certain size on one side of the display unit 130. Accordingly, the user can select a corresponding slide image. In the multi view function, the controller 160 may initialize the touch sensors 140 so that images corresponding to the other (non-displayed) contents stored in the storage unit 170, can be displayed on one side of the display unit 130 and a user can activate images in the display unit 130.

The controller 160 may determine whether an asymmetrical bend event is detected with respect to the center of the display unit 130. When the controller 160 determines that an asymmetrical bend event is detected, the controller may execute a page turning function. The page turning function may allow a user to open a plurality of pages. The page turning function can provide display of portions of other (not currently displayed) pages in a block width on one side of the display unit 130. The width of the block width may be increased or decreased according to the bend angle. When portions of pages are displayed at a certain time interval, the time interval can be adjusted according to the width of the block width. For example, if the width of the block width is increased, the time interval may also increase. By contrast, if the width of the block width is decreased, the time interval may be decreased. If a touch event occurs within the block width, the controller 160 may turn touch event-released pages in a predetermined direction, and may simultaneously display pages that retain the touch event. If the touch event is detected and subsequently released by the user in display areas of a plurality of pages, the controller 160 may remove the touch event-released pages in a certain direction at a certain time interval. If a page has a bookmark, the controller 160 may add an image or mark to the page to differentiate the page from other pages. In some cases, the controller 160 may increase the ratio of a display area within the block width of the page having a bookmark to a display area within the block width of pages without a bookmark. If a touch event occurs and is then released, the controller 160 may display the page having a bookmark for longer than the pages without a bookmark before removing or moving the page in a certain direction. If a page is set by a lock bar, although a bend event may not continue to be detected, the controller 160 can retain the block width. The controller 160 can display a bookmark symbol within the block width so that the user can easily search for the page having the bookmark symbol. When the user touches the bookmark, the controller 160 may control the display unit 130 to immediately display the page having the bookmark symbol.

The controller 160 may also determine whether bend events have directions differing from one another. For example, if the controller 160 determines that a plurality of bend events have bend directions differing from each other, the controller 160 may enlarge or reduce a size of content displayed in an area that is bent upwards or downwards, respectively, and may simultaneously reduce or enlarge a size of other content displayed in other areas that are bent downward or upward, respectively.

As shown, the flexible display device 100 and the data displaying method thereof, according to exemplary embodiments of the invention, can display different contents according to the areas and angle of the bend on the display unit 130. Although the displayed contents are identical to each other, the flexible display device 100 and the data displaying method thereof can display various contents in different displaying modes so that the user can easily search for and view the contents.

As described above, the flexible display device 100 and the data displaying method thereof can generate input signals in various modes, and can display data based on the generated input signals.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A flexible display device, comprising:
 a display unit configured to display content;
 a touch sensor configured to detect a touch gesture;
 a bending sensor configured to detect a bending; and
 a controller configured to perform a function corresponding to a combination of the touch gesture and the bending, wherein the controller is configured to perform the function according to a detected change in the touch gesture while the bending is retained, the touch gesture and the bending being respectively detected in different locations of the display unit.

2. The device of claim 1, wherein the touch gesture comprises at least one of a touch and a drag.

3. The device of claim 1, wherein the bending comprises an asymmetrical bend of the display unit with respect to a center axis of the device.

4. The device of claim 1, wherein the touch gesture and the bending are respectively detected on the display unit at different times.

5. The device of claim 1, wherein the combination of the touch gesture and the bending comprises the touch gesture as a first input and the bending as a second input.

6. The device of claim 1, wherein the display unit is configured to display a portion of the content within a width and with an interval between the portion of the content and another portion of the content in response to detection of the bending, the interval between the portion of the content and the other portion of the content being determined according to the bending.

7. The device of claim 6, wherein, in response to the detection of the bending, the controller is configured to identify a location corresponding to the detected touch gesture, and wherein a distance from the location to an edge of the display unit is equivalent to the width.

8. The device of claim 6, wherein the display unit is configured to adjust and display a size of the width according to a change in a bending angle.

9. The device of claim 8, wherein the display unit is configured to adjust and display the interval according to the adjusted size of the width.

10. The device of claim 6, wherein, while the bending is retained and movement of the touch gesture toward the edge of the display unit is detected within the width, the controller is configured to move content released by the touch gesture in a direction and display other content retaining the touch gesture.

11. The device of claim 6, wherein, when the increase of the bending angle associated with the bending is detected while the touch gesture is retained and the interval associated with the content in the width extends through a location at which the touch gesture is detected, the controller is configured to move the content extended through the location in a direction and display other content retaining the touch gesture.

12. The device of claim 1, wherein, when the touch gesture and the bending are detected adjacent to a corner of the display unit and movement of the touch gesture toward the corner is detected, the controller is configured to move content released by the touch gesture in a direction and display other content retaining the touch gesture.

13. The device of claim 1, wherein the display unit further comprises a first display unit and a second display unit, the first and second display units being connected to each other with respect to an axis of the device.

14. The device of claim 13, wherein, when the second display unit is bent at a threshold angle, the controller is configured to perform a content turning function via movement of the displayed content from the second display unit to the first display unit.

15. The device of claim 1, wherein, in response to the touch gesture being detected on content being moved, the controller is configured to stop movement of the content being moved.

16. A method, comprising:
   detecting a touch gesture on a display unit;
   displaying content on the display unit according to the detected touch gesture;
   detecting bending of the display unit; and
   performing a function corresponding to a combination of the touch gesture and the bending, wherein the function is performed according to a detected change in the touch gesture while the bending is retained, the touch gesture and the bending being respectively detected in different locations of the display unit.

17. The method of claim 16, wherein the touch gesture comprises at least one of a touch and a drag.

18. The method of claim 16, wherein the bending comprises an asymmetrical bend of the display unit with respect to a center axis of the device.

19. The method of claim 16, wherein the touch gesture and the bending are respectively detected on the display unit at different times.

20. The method of claim 16, wherein the combination of the touch gesture and the bending comprises the touch gesture as a first input and the bending as a second input.

21. The method of claim 16, wherein displaying the content comprises displaying a first portion of the content within a width and with an interval between the first portion of the content and a second portion of the content in response to detection of the bending, the interval between the first portion of the content and the second portion of the content being determined according to the bending.

22. The method of claim 21, wherein displaying the portion of the content comprises adjusting the size of the width according to a change in a bending angle.

23. The method of claim 22, wherein displaying the first portion of the content further comprises adjusting the interval according to the adjusted the size of the width.

24. The method of claim 21, wherein displaying the content comprises:
   identifying, in response to the detection of the bending, a location corresponding to the detected touch gesture; and
   setting a distance from the location to an edge of a display unit as the width.

25. The method of claim 21, wherein displaying the content comprises moving, while the bending is retained and movement of the touch gesture toward the edge of the display unit is detected within the width, content released by the touch gesture in a direction and displaying other content retaining the touch gesture.

26. The method of claim 21, wherein displaying the content further comprises moving, when the increase of the bending angle associated with the bending is detected while the touch gesture is retained and the interval associated with the content in the width extends through a location at which the touch gesture is detected, the content extended through the location in a direction and displaying other content retaining the touch gesture.

27. The method of claim 16, wherein displaying the content comprises moving, when the touch gesture and the bending are detected adjacent to a corner of the display unit and movement of the touch gesture toward the corner is detected, content released by the touch gesture in a direction and displaying other content retaining the touch gesture.

28. The method of claim 16, further comprising:
   performing a content turning function by moving the displayed content from a second display unit to a first display unit when the second display unit is bent at a threshold angle.

29. The method of claim 16, wherein displaying the content comprises stopping movement of content when the touch gesture is detected on the content being moved.

30. A flexible display device, comprising:
   a display unit configured to display content;
   a touch sensor configured to detect a touch gesture;
   a bending sensor configured to detect a bending; and
   a controller configured to:
      select a function from among a plurality of functions according to a combination of the touch gesture, the bending, and a location of the bending, each of the plurality of functions being associated with a corresponding touch gesture, bending, and location of bending; and
      perform an aspect of the function according to a detected change in the bending while the touch gesture is retained,
   wherein the touch gesture and the bending are respectively detected in different locations of the display unit.

31. A method, comprising:
   detecting a touch gesture on a display unit;
   displaying content on the display unit according to the detected touch gesture;
   detecting bending of the display unit;
   selecting a function among a plurality of functions according to a combination of the touch gesture, the bending, and a location of the bending, each of the plurality of functions being associated with a corresponding touch gesture, bending, and location of bending; and
   performing an aspect of the function according to a detected change in the bending while the touch gesture is retained,
   wherein the touch gesture and the bending are respectively detected in different locations of the display unit.

* * * * *